United States Patent [19]

Phillis et al.

[11] Patent Number: 5,400,264
[45] Date of Patent: Mar. 21, 1995

[54] SUBOPTIMAL JOINT PROBABILISTIC DATA ASSOCIATION

[75] Inventors: Gary L. Phillis; James A. Roecker, both of Boulder, Colo.

[73] Assignee: International Business Machines Corporation, Armonk, N.Y.

[21] Appl. No.: 54,812

[22] Filed: Apr. 29, 1993

[51] Int. Cl.$^6$ .............................. G01S 17/00
[52] U.S. Cl. ...................... 364/516; 364/460
[58] Field of Search ............ 364/514, 516, 517, 439, 364/456, 460, 461

[56] References Cited

U.S. PATENT DOCUMENTS 4,559,537 12/1985 Pearson, Jr. et al.

OTHER PUBLICATIONS

"Multitarget-Multisensor Tracking; Advanced Applications" Bar-Shalom, Artech House pp. 1–23, vol. 1, 1990.

"Tracking And Data Association" Bar-Shalom pp. 217–235, Academic Press, 1990.

Primary Examiner—Emanuel T. Voeltz
Assistant Examiner—Edward Pipala
Attorney, Agent, or Firm—D. A. Mims

[57] ABSTRACT

A computer method for accurate target tracking by a faster method for hit-to-target data association. The method involves using an approximation of a weighted centroid of hits to update the calculated tracks. The result, while losing theoretical accuracy since it approximates the calculation, produces fast calculations. Further, the calculated result has sufficient accuracy for most practical applications.

5 Claims, 3 Drawing Sheets

S-1 ΔT=6-139

S-1 ΔT=6-139

SUBOPTIMAL JOINT PROBABILISTIC DATA ASSOCIATION

FIELD OF THE INVENTION

The invention disclosed broadly relates to data processing systems and methods and, more particularly, relates to an improves method for target tracking which updates the calculated tracks by using an approximation of a weighted centroid of hits.

BACKGROUND OF THE INVENTION

Target tracking is the process of calculating the path or track of a moving object by monitoring its current position and using the data obtained from this monitoring to project its future position. An example of target tracking is the process of air traffic control where radar stations send out signals and receive reflections (hits) from on-coming planes (targets), thereby determining the flight path (track) of the plane.

In most practical applications, it is rare that a single target needs to be tracked. More usually, multiple targets are moving in relatively close proximity to each other and the path of each must be distinguished and determined. In air traffic control, this is most evident at airports where multiple planes are either on an approach or take-off flight path in the airspace surrounding the airport.

A significant problem in multiple target tracking is the hit-to-track data association. A precise definition of a "hit" is a received signal from a target or background clutter which provides positional information. Generally, in calculating a track (that is, the path taken by the target), a prediction is made as to point at which the next hit against the target will be made. A region, known as an "extension gate" is defined about that point. FIG. 1 shows the extension gate (100) for track J (30). Hits within the extension gate of a target are candidates for being used in further calculation of the track. Where there are multiple targets, closely spaced, a hit against second target may also be located in the extension gate of the first target. In FIG. 1, this is illustrated by hit 4 which is associated with track k (4)) but lies within track j's extension gate (100). If that hit is associated with the first target (i.e., incorrectly associated with the first track), the calculated track that results could diverge from the actual path of the target. In the worst case, the calculated track can terminate. Thus, where multiple signals are being received from multiple targets, it is imperative that each received hit be associated with the correct target and/or be identified as background clutter (and therefore be discounted in the track calculations).

Probabilistic Data Association

Prior methods for this data association problem include various optimal and suboptimal two-dimensional assignment algorithms which make hit-to-track associations.

The idea of Probabilistic Data Association (PDA) was first proposed by Bar-Shalom and Tse, "Tracking in a Cluttered Environment with Probabilistic Data Association," *Automatica*, Vol. 11, September 1975, pps. 451–60. PDA is a method of associating hits detected in the current readout of the sensor, or scan, with current tracks using a probabilistic score. A score is a measure of the goodness of fit of the hit-to-track association. Once the score for each hit is calculated, the tracks are updated with a weighted sum of the hits, where the weights are the calculated probabilities. This was thought to be a very good method for tracking targets in dense clutter without having the large processor and memory usage needed for multiple hypothesis tracking. This idea was extended to tracking maneuvering targets.

The PDA approach assumes all hits in a particular target's extension gate all either are a hit from the target or are random clutter points. If another target hit is persistently in this particular target extension gate, the probability calculation will be wrong and poor tracking will result.

To account for the problem of two or more targets in the same extension gate, a method was developed which assigned a weight for the reasonable hits and used a weighted centroid of those hits to update the track. This method of weighting the hits is known as Joint Probabilistic Data Association (JPDA). (JPDA is discussed in T. E. Fortmann, Y. Bar-Shalom, and M. Scheffe, "Multi-Target Tracking Using Joint Probabilistic Data Association " *Proc. of the IEEE Conference on Decision and Control*, Vol 2 December 1980 pps 807–12 and "Sonar Tracking of Multiple Targets Using Joint Probabilistic Data Association," *IEEE Journal of Oceanic Research*, Vol. OE-8, July 1983, pps. 173–184.)

Briefly, in JPDA, a joint probability is calculated over all targets and hits. The joint probability is the probability of all the individual events combined as a joint event. Thus, JPDA includes the possibility of multiple hits in one track extension gate coming from other targets. This method was later extended to include the radial velocity measurement from doppler radars (V. Nargarajan, R. N. Sharma, and M. R. Chidambara, "An Algorithm for Tracking a Maneuvering Target in Clutter," *IEEE Transactions on Aerospace and Electronic Systems, Vol. AES*-20, September 1984, pp. 560–73, corrected, ibid., December 1984, Vol. AES-20, p. 844.)

While this JPDA method worked for its intended purpose, it required a prohibitive amount of processor time in calculating the joint probabilities. This issue was addressed with a distributed processing solution (See, K. C. Change and Bar-Shalom, "Distributed Adaptive Estimation with Probabilistic Data Association," *Automatica*, Vol. 25, No. 3, 1989, pps. 359–69) and fast algorithms using some matrix manipulations (See S. D. O'Neil and M. F. Bridgland, "Fast Algorithms for Joint Probabilistic Data Association," *Procedure of the SDI Panels on Tracking*, No. 1/1991, April 1991, pps. 3-102-3-122). However, these approaches still had problems in terms of 1) the time it took to perform the calculation, 2) the size of computer memory required and, in general, 3) implementation.

In *Multitarget-Multisensor Tracking: Advanced Applications*, Vol. 1, Yaakov Bar-Shalom, editor, 1990, Chapter 1, Robert Fitzgerald proposed an ad hoc method of calculating a probability that approximates the JPDA calculation. The following section briefly describes the JPDA Method (or "Filter"). A more detailed derivation of the JPDA filter can be found in Yaakov Bar-Shalom and Thomas E. Fortmann, *Tracking and Data Association*, 1988. JPDA Method Optimal JPDA Filter The difference between the PDA filter and the optimal JPDA filter is the method of calculating the probability weights In the case of the PDA filter, the weights are calculated independently track by track. For each track, PDA calculates the probability of each hit in the track's extension gate using Bayes rule. The probability that the target was not detected can also be calculated using a uniform distribution or a parametric Poisson distribution for the false or clutter hits. This method does not consider any other hits in the track extension gate to be from another target.

The JPDA filter's probability calculations do consider other hits coming from other targets and are quite complex and computationally intensive. In JPDA, the joint probability is calculated by first calculating the probability of all possible feasible joint events, where one possible joint event at time k is denoted as $\theta(k)$. A feasible joint event is a non-conflicting association of current targets with hits, while the remaining unassociated hits would be declared as clutter points. This non-conflicting association is based on the requirement that no two tracks are associated with the same hit. A feasible joint event does not have to associate all tracks to a hit. This would correspond to a probability of detection $P_D$ Of less than one.

With reference to FIG. 1, an example of a feasible joint event would be as follows. Suppose there are current tracks h, i,j,k,,l (represented in FIG. 1 as 10, 20, 30, 40 and 50 respectively) and present hits (1,2,3,4,5,6). In FIG. 1, the "x's" indicate the positions of hits, while the dotted lines indicate positions of the track extension point.

In this situation, a feasible joint event would be described by the following equation:

$$\theta(k) = (i,3) \ (j,2)(h,6)(l,1)(\text{clutter hits } 4,5) \quad (1)$$

This joint event is the event which occurs when tracks i, j, h, and l are associated with hits 3, 2, 6, and 1, track k was not detected on this scan, and hits 4 and 5 were clutter.

In the JPDA filter all possible joint events must be constructed and their probabilities calculated. The probability of an event given the history of hits $(Z^k)$ up until time k is given by $$\begin{aligned} P\{\theta(k)/Z^k\} &= P\{\theta(k)/Z(k), Z^{k-1}\} \\ &= \frac{1}{c} p[Z(k)/\theta(k), Z^{k-1}] P\{\theta(k)/Z^{k-1}\} \\ &= \frac{1}{c} p[Z(k)/\theta(k), Z^{k-1}] P\{\theta(k)\} \end{aligned} \quad (2)$$

where c is a normalizing constant and Z(K) is the set of hits at time k. The Probability Density Function (PDF) on the right hand side of the equation is the density function when evaluated for the present set of hits. Given the joint event $\theta(k)$ is the correct hypothesis of assignments, and given the past history of hits, the PDF is given by $$p[Z(k)/\theta(k), Z^{k-1}] = \prod_{j=1}^{m} p[z_j(k)/\theta_j(k), Z^{k-1}] \quad (3)$$

where $z_j(k)$ is the j-th hit in Z(k), and $\theta_j(k)$ is the assignment of the j-th hit to either a current track or clutter. The PDF of each hit is given by $$p[z_j(k)/\theta_j(k), Z^{k-1}] = \begin{cases} N[v_j(k)] & \text{hit } j \text{ assigned track} \\ V^{-1} & \text{hit } j \text{ clutter} \end{cases} \quad (4)$$

where V is the volume of the extension gate and N[] is the normal density function with zero mean and covariance equal to the covariance matrix of $v_j(k)$ for the track to which hit j is assigned. Therefore, $$p[Z(k)/\theta(k), Z^{k-1}] = V^{-\phi} \prod_{j=1}^{m} [N[v_j(k)]]^{\tau_j} \quad (5)$$

where $\tau_j$ is equal to one if the j-th hit is assigned to a track and zero otherwise, and $\phi$ is the number of points determined to be clutter rather than points along a track. The next step is to calculate the prior probability $P\{\theta(k)\}$. This can be done by writing the prior probability as $$\begin{aligned} P\{\theta(k)\} &= P\{\theta(k),\delta,\phi\} \\ &= P\{\theta(k)/\delta,\phi\} P\{\delta,\phi\} \end{aligned} \quad (6)$$

where $\delta$ indicates which tracks have been assigned to present hits. The first factor, $P\{\theta(k)/\delta, \phi\}$ can be found by noting that the number of targets detected in the joint event $\theta(k)$ is m-$\phi$, where m is the total number of hits. The number of joint events with the same set of targets detected is the permutation of m hits taken as m-$\phi$. Assuming that each event is equally likely, $$P\{\theta(k)/\delta,\phi\} = \frac{\phi!}{m!} \quad (7)$$

The last factor $P\{\delta, \phi\}$ is given by $$P\{\delta,\phi\} = \prod_{t=1}^{\tau} (P_D^t)^{\delta_t} u_t(\phi) \quad (8)$$

where $P^t_D$ is the probability of detection for track t, $\delta_t$ is a binary indicator that track t has been assigned a hit in the joint event, $\theta(t)$ and $u_t(\phi)$ is the prior probability mass function for the number of clutter hits in this joint event. The binary indicator $\delta_t$ is a one if track t is assigned a hit and zero if not. The nonparametric JPDA, which is used here, assumes a diffuse prior probability so that $u_t(\phi)$ will cancel from each term in the 1/c normalizing factor. Since m! is in each of the terms, it will also cancel in the normalizing factor. Combining equations (8-13) into equation (7), the probability of the joint event, i s given by $$P\{\theta(k)/Z^k\} = \frac{1}{c} \frac{\phi!}{V^\phi} \prod_{j=1}^{m} [N[v_j(k)]]^{\tau_j} \prod_{t=1}^{\tau} (P_D^T)^{\delta_t}(1 - P_D^T)^{\delta_t} \quad (9)$$

From the law of total probability, the weighting factor, or probability of track t being associated with hit j, is the sum of the probabilities of all joint events in which track t is 15 associated with hit j. This can be written as $$\beta_j(k) = \sum_{\theta(k)} P\{\theta(k)/Z^k\}\omega(\theta(k)) \quad (10)$$

where $\omega(\theta(k))$ is a binary variable indicating whether track t is associated with hit j in $\theta(k)$. The normalizing constant c is the sum over all joint events of the numerator of $P\{\theta(k)/Z^k\}$.

OBJECTS OF THE INVENTION

Accordingly, it is an objective of this invention to provide an improved method of target tracking which requires less processing time without undue sacrifice of accuracy.

It is a further objective of this invention to provide a method of target tracking which can successfully track multiple targets in dense clutter.

It is a further objective of this invention to provide a method of multiple target tracking which is successful when several closely spaced objects are traveling in the same direction.

SUMMARY OF THE INVENTION

These and other objects, features and advantages are accomplished by the invention disclosed herein.

A computer method is disclosed for accurate target tracking by a faster method for hit-to-target data association. The method involves using an approximation of a weighted centroid of hits to update the calculated tracks. The new method, presented here, uses the idea of partial joint events. These partial joint events are the association of track t1 with hit j1, and the association of track t2 with hit j2, assuming these are non-contending associations. Tracks t1 and t2 must have overlapping extension gates with a common hit for this to be considered a joint event.

The method is referred to as suboptimal because the joint events considered are subsets of the full range of optimal joint events. The subset considers just two events. The choice of pairs used in this suboptimal calculation is made based on that hit, which lies within the extension gate of the track under consideration, and has a maximum value for its Gaussian density function.

The suboptimal probability for hit j is used to weight the value which is the $P_{toj}$ difference between the j-th hit and the predicted position of the track at time k.

The result, while losing theoretical accuracy since it approximates the calculation, is significantly faster to calculate than has been available in prior art. Further, the calculated result has sufficient accuracy for most practical applications.

BRIEF DESCRIPTION OF THE DRAWINGS

These and other objects, features, and advantages of the invention will be more fully appreciated with reference to the accompanying figures.

DETAILED DESCRIPTION OF THE INVENTION

Figure 2:
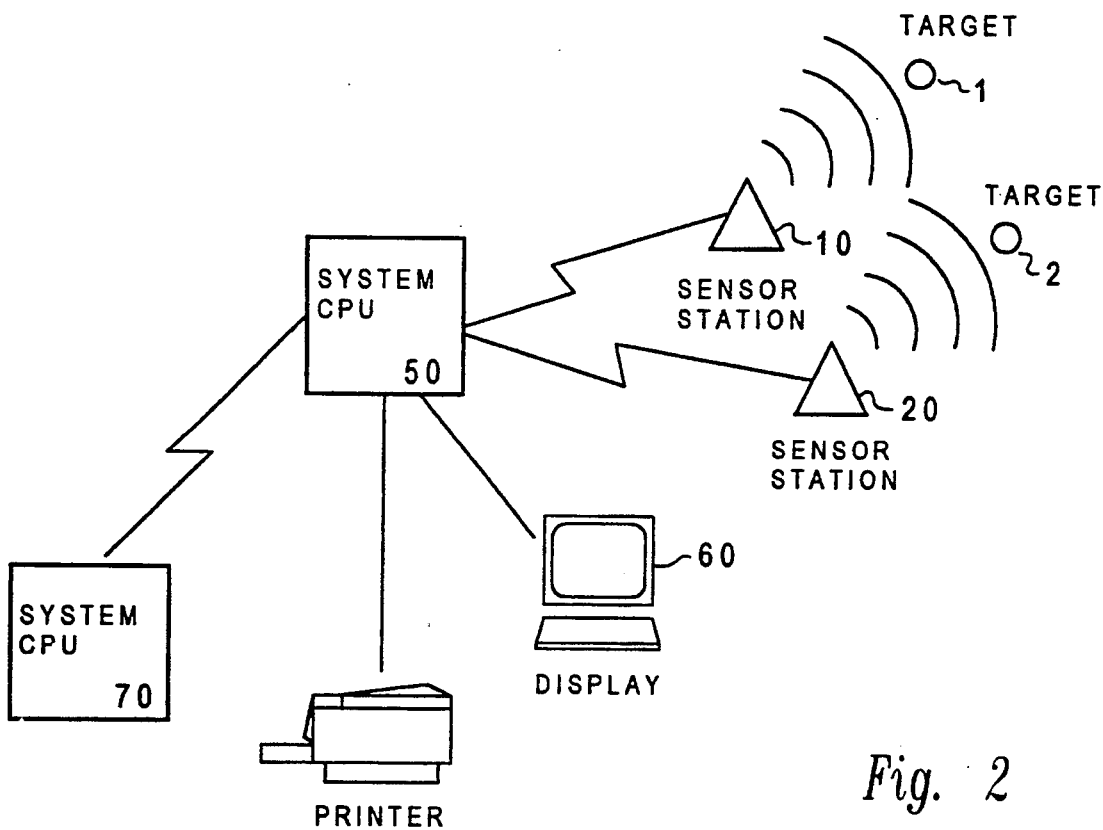
FIG. 2 is a schematic diagram of the method of the invention.
Figure 3:
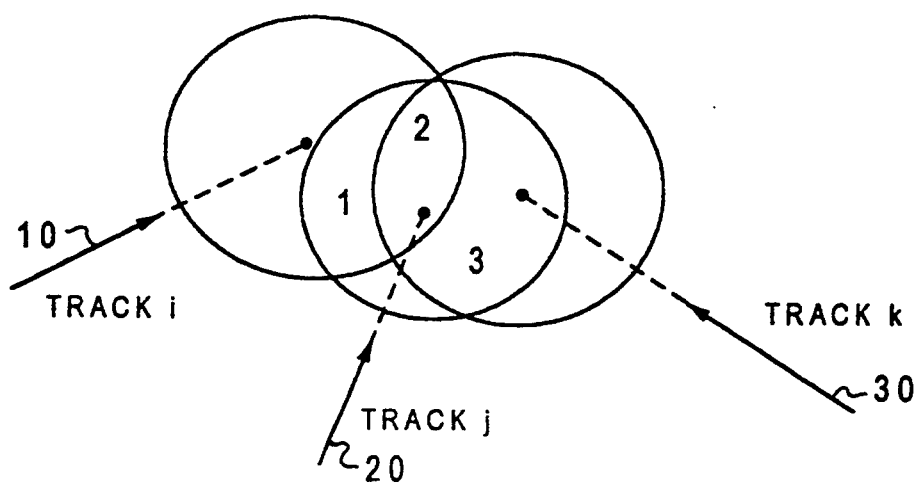
FIG. 3 is an example of three hits and three tracks.
Figure 4:
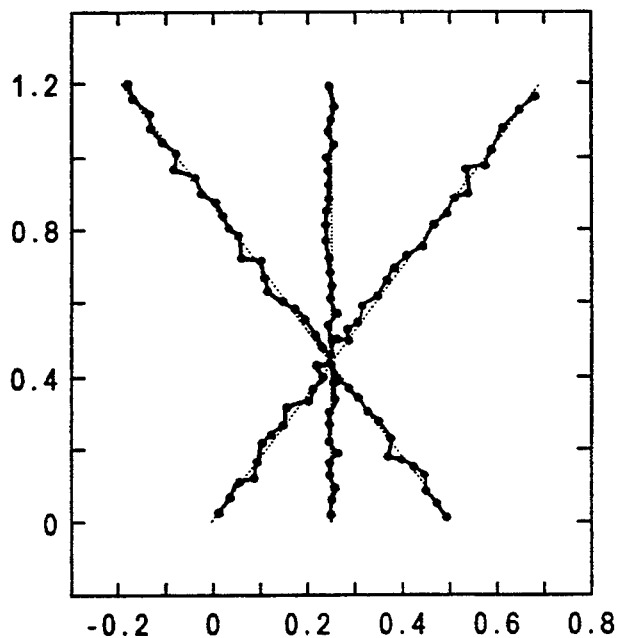
FIG. 4 is an example of a weighted suboptimal JPDA.

FIG. 2 is a schematic diagram of the method of the invention. Multiple sensor stations (10 and 20) receive data on the hits received from two targets (1 and 2) and transmit this data to a computer system 50. The computer system 50 is a data processor which executes a computer program embodied in TABLE 1. The system can accept digital data streams from several sensor stations and can perform the method of TABLE 1 to yield the track updates for the multiple targets. The updated tracks are then displayed on a display 60 for viewing by a user, printed out for further analysis on printer 65, are further processed within computer system 50, and/or are sent to another computer system 70.

In accordance with the invention, a new suboptimal JPDA filter is used to update the tracks.

From the earlier section on the optimal JPDA filter, the probability of the joint event $\theta(k)$ is given by equation 9, that is:

$$P\{\theta(k)/Z^k\} = \frac{1}{c} \frac{\phi!}{V^\phi} \prod_{j=1}^{m} [N[\nu_j(k)]]^{\tau_j} \prod_{t=1}^{\tau} (P_D^t)^{\delta_t}(1 - P_D^t)^{\delta_t} \quad (11)$$

The expression can be simplified by assuming the probability of detection $P^t{}_D$ for each target is one or very nearly one This is a reasonable assumption requiring good track initiation. If $P^t{}_D$ is equal to one, all of the present tracks will be detected implying that all $\delta_t$'s are one. With this assumption the probability reduces to $$P\{\theta(k)/Z^k\} = \frac{1}{c} \frac{\phi!}{V^\phi} \prod_{j=1}^{m} [N[\nu_j(k)]]^{\tau_j} \quad (12)$$

If the $P^t{}_D$ is one then all of the targets being tracked will be detected on this scan. Therefore, all of the joint events, $\theta(k)$ will have the same number of hits declared to be clutter and all of the $\phi$'s for each $\theta(k)$. will be equal. In this case the terms $\phi!$ and $V^\phi$ will be the same in all of the joint events and will cancel with the normalizing factor, resulting in $$P\{\theta(k)/Z^k\} = \frac{1}{c} \prod_{j=1}^{m} [N[\nu_j(k)]]^{\tau_j} \quad (13)$$

This still leaves the formidable task of calculating the density functions for all possible joint track-to-hit assignments. An example of a single event is the numerator of equation (16). This event is track t assigned to hit j. This is done for all hits in track t's extension gate. The normalizing factor is unfortunately not normalizing in this case. The single event density is divided by all single events for this track and all single events for the hits in track t's extension gate with other tracks.

The new method, presented here, uses the idea of partial joint events. These partial joint events are the association of track t1 with hit j1, and the association of track t2 with hit j2, assuming these are non-contending associations. Tracks t1 and t2 must have overlapping extension gates with a common hit for this to be considered a joint event. This is suboptimal because all joint events are subsets of the optimal joint events as described by equation (1). The subset considers just two events. This would replace the multiplication in equation (21) from j=1 to m with j=1 to 2. The choice of the pairs used in this suboptimal calculation is accomplished through the following procedure.

The method is exercised for each of the multiple targets tracks. The method for updating a track in accordance with the invention is described in TABLE 1.

Referring to TABLE 1, in step 1, the method begins with the selection of a track, $t_o$ In step 2, each hit which lies in t's extension gate is identified. The result of this step is a collection of hits, $h_j$ In the flow diagram, it is assumed there are m such hits.

For each hit $h_j$ which was identified in the preceding step, all tracks whose extension gates enclose that hit are identified. The indices of the selected tracks form a set $L_j$.

In Step 4, a collection T of all the indices of each set $L_j$ is formed. The index of the initial track chosen (i.e. 0 in $t_0$) is excluded from the collection T.

Looked at another way, the collection T consists of the indices of all tracks which have in their extension gate a hit which also lies in the selected tracks extension gate.

Figure 1:
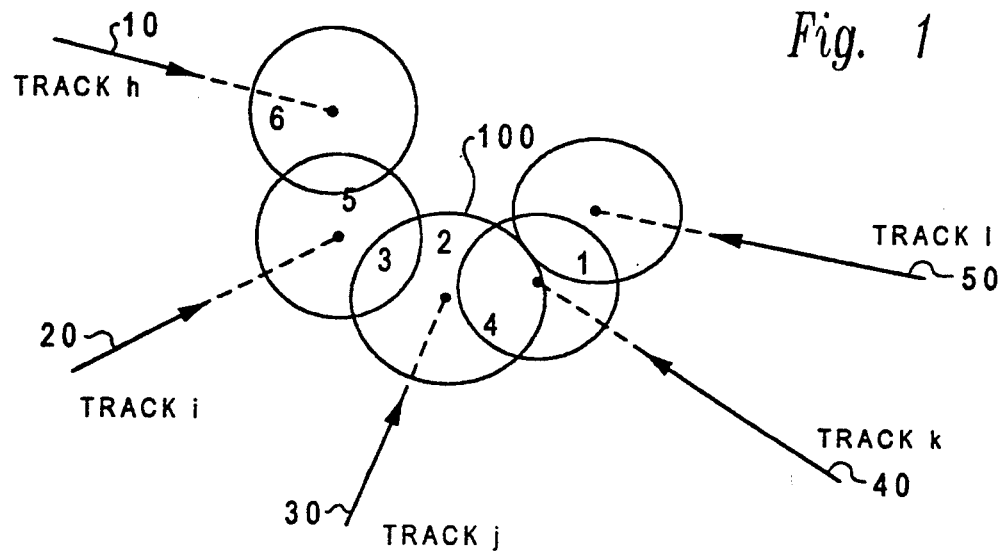
FIG. 1 is an example of five current tracks with five new hits.

As an illustration of the above steps, consider FIG.1. If steps 1 through 3 were carried out for FIG.1 and track $t_o$ is taken as track j (30), then the collection of hits consists of hits 1, 3 and 4. The collection of tracks whose extension gates enclose these hits are tracks k (40), which encloses hit 4, and track i (20), which encloses hit 3.

Steps 5 and 6 are carried out for each hit in the set of hits identified in step 2. The result of these steps is a weight which is assigned to each hit.

Step 5 consists of selecting a hit $h_j$ from the collection of hits in $t_0$'s extension gate. This hit will be associated with track $t_0$.

Step 6 consists of selecting another hit (i.e. one other than $h_j$) to be associated with each track in the collection T. The hit selected will be one which is within the tracks extension gate and is "closest" to that extension gate with that "closeness" measured by the statistical distance. More precisely, Step 6 consists of selecting another hit $h_j$ from the set for each track $t_i$ which extends (i.e., has a common hit) with track $t_0$. The hit selected is that which has a maximum value of $G_{t_ih}$. The maximum is referred to as $M_i$. There is one exception. Track $t_i$ may not have "another" hit. That is, hit j may be the only hit shared between track $t_i$ and track $t_o$. In this case, $M_i$ is taken as $M_{toj}$.

In step 7, a weighting function is calculated for each hit j. Specifically, the weight $H_{toj}$ is calculated by taking the sum of all $M_i$'s calculated in step 4 and multiplying that sum by $G_{toj}$. If there are no $M_i$'s, that is, if there were no other tracks whose extension gates shared hits with track $t_0$'s extension gate, then the weight $H_{toj}$ is set equal to $G_{toj}$.

These weights $H_{toj}$ represent the likelihood function, which is the individual Gaussain density function multiplied together, of a particular dual event.

After Steps 5 through 7 have been performed for each j in the set of hits $h_j$ in $t_0$'s extension gate, the suboptimal probability for the jth hit can be calculated in Step 8. This suboptimal probability is obtaining by dividing $H_{toj}$ by a value obtained by adding a constant B to the sum of all $H_{tok}$ that were calculated for all of the hits $h_k$. The value of the constant B depends on clutter density.

In Step 9, estimate the state based upon the weight of the hits, where the weight is given in step 8.

One implementation of Step 9 would be to use the well-known method involving the Kalmain gain function. This particular implementation is shown in Steps 9A and 9B of Table 1. In Step 9A, $v_j(k)$ is calculated for the selected track $t_O$ by calculating for each hit j in $t_0$'s extension, the product of $P_{toj}$ and $v_j(k)$ where $v_j(k)$ is the difference between the j-th hit and the predicted position of the track at time k. The sum of each product is then taken. In Step 9B, the state estimate at time k given k updates is calculated by adding to the prediction of the state at time k given k−1 updates, the products of the Kalman again and v(k).

Implementation

As was previously stated, the JPDA can result in track bias and coalescence in a dense target environment. Further, closely spaced targets traveling in the same direction cause weighted JPDA filters to converge to a single track. If two or more tracks continually update with the same hit, duplicate tracks can result from possible conflicting assignments. A simple duplicate track elimination routine in New Suboptimal JPDA addresses these problems. An example of pseudocode illustrating such a routine may be found in TABLE 2.

Figure 5:
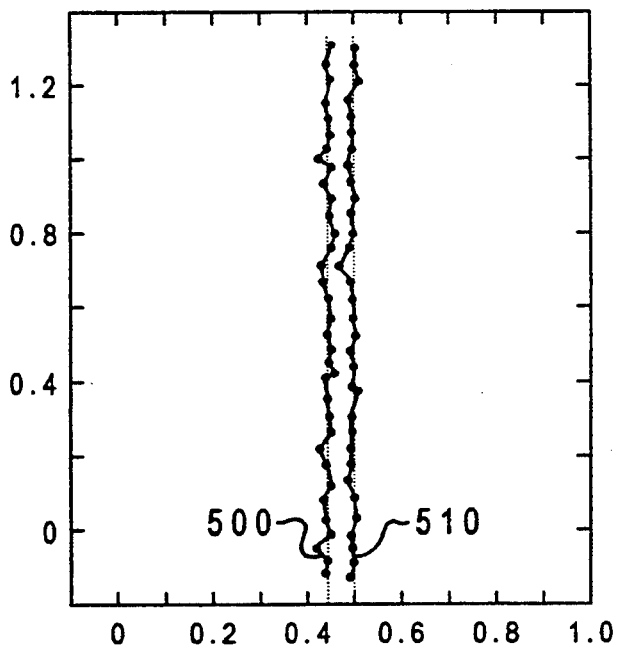
FIG. 5 is an example of two closely spaced targets with parallel motion.

In one implementation, the weighted JPDA filter was calculated for a three target crossing situation. Referring to FIG. 5, the targets initial positions are (0,0), (0.25,0) and (0.5,0) (FIG. 5, (200), (210) and (220) respectively. The targets are assumed to have a constant velocities of 0.01/sec, 0.009/sec and 0.0105/sec. The initial headings measured from the x-axis are 60 degrees, 90 degrees and 120 degrees, respectively. The standard deviation of the random noise or jitter added to the positions is 0.009. The sensor revisit time used was 4 seconds.

The constant acceleration chosen in this example exaggerates the bias that can occur in the JPDA filter when the sum of the probabilities of the hits in a target's extension gate do not add up to one: namely that the calculated track may be drawn off course by another closely spaced track or a clutter track. The problem is that there may not be enough weight to the $v_j(k)$ to correct, the track in a reasonable amount of time.

The suboptimal JPDA filter introduced here is formulated so that the sum of the probabilities of the hits in each track's gates is equal to one when B=0. FIG. 5 shows the same three crossing targets and the tracks formed using the suboptimal JPDA filter. Notice that no track gets drawn off to one side. This is because the weights in the new suboptimal formulation always add up to one.

Although a specific embodiment of the invention has been disclosed, it will be understood by those having skill in the art that changes can be made to the specific embodiment without departing from the spirit and the scope of the invention.

TABLE 1

| | |
|---|---|
| Step 1 | Select of a track, $t_o$ |
| Step 2 | Identify each hit which lies in t's extension gate. The collection is expressed as: $H = \{h_j | h_j \epsilon t_o\text{'s extension gate}\} = \{h_j | j=1, \ldots m\}$    (1) |
| Step 3 | For each hit $h_j$, identify all tracks whose extension gates enclose that hit are identified. The indices of the selected tracks form a set $L_j$ |

TABLE 1-continued

| Step | Description |
|---|---|
| | $L_j = \{i \mid t_i \text{ can extend with hit } j\}$ (2) |
| Step 4 | Form a collection T of all the indices of each set $L_j$ is formed. The index of the initial track chosen (i.e. 0 in $t_o$) is excluded from the collection T. Thus, |

$$T = \left( \bigcup_{j \text{th} \neq t\text{'s gate}} L_j \right) t_o \quad (3)$$

| Step | Description |
|---|---|
| Step 5 | Select a hit $h_j$, from the collection H. This hit will be associated with track $t_0$. |
| Step 6 | Select another hit $h_j$ from the set for each track $t_i$ which extends (i.e. has a common hit) with track $t_0$. The hit selected is that which has a maximum value of $G_{tih}$. The maximum is referred to as $M_i$. There is one exception. Track $t_i$ may not have "another" hit. That is, hit j may be the only hit shared between track $t_i$ and track $t_o$. In this case, $M_i$ is taken as $M_{toj}$. |

$$M_i = \underset{h \in L_j; h \neq j}{\text{MAX}} (G_{ih}) \quad (4)$$

or $$M_i = G_{ij} \text{ if MAX} = 0 \quad (5)$$

Repeat Steps 5 and 6 until all hits in the set H are chosen.

| Step | Description |
|---|---|
| Step 7 | Calculate a weighting function for each hit j. |

$$H_{toj} = G_{toj} \underset{s \in T}{\Sigma} M_s \text{ if } T \neq \phi$$
$$= G_{toj} \text{ if } T = \phi \quad (6)$$

| Step | Description |
|---|---|
| Step 8: | Calculate the suboptimal probability for the jth hit: |

$$P_{toj} = \frac{H_{toj}}{B + \sum_{k=1}^{m} H_{tok}} \quad (7)$$

where the value of the constant B depends on clutter density. Using the Fitzgerald recommendations, B may be taken as 0.

| Step | Description |
|---|---|
| Step 9: | Estimate the state based upon the weight of the hits, where the weight is given in step 8. |

An Example of an Implementation of Step 9:

| Step | Description |
|---|---|
| Step 9a: | Calculate v(k) |

$$v(k) = \sum_{j=1}^{m} P_{toj} v_j(k) \quad (8)$$

| Step | Description |
|---|---|
| Step 9A | Calculate the state estimate at time k given k updates for track $t_0$ |
| | $(k/k) = (k/k-1) + W(k)w(k)$ (9) |
| | where $(k/k-1)$ is the prediction of the state at time k given k−1 updates and W(k) is the Kalman gain. |

TABLE 2

Start Procedure

```
Loop1: loop over current tracts k (t=1,m)
    Propagate tract t
    Compute P_tj for reasonable hit j
    Update track t using JPDA method
    If P_tj is greater than .5, flag hit j
End Loop 1
Loop 2: loop over all hits
    If hit j is flagged for multiple tracks t
        Test: Do these tracks have a common history
            (4 hits) of P_tj greater than .5
            If yes, eliminate
            If no, keep
End Loop 2
```

TABLE 2-continued

Start Procedure

End Procedure

What is claimed is:

1. In a computer implemented target tracking system, including a plurality of sensor stations, operatively connected to a data processing system, a computer method for updating the tracks associated with multiple targets using hit-to-target data association, comprising the steps of:

a) identifying a plurality of within said data processing system targets to be tracked by said plurality of sensor stations and creating an associated track for each of said targets, said track comprised of a collection of points in space, each of said points associated with a specific point in time;

b) for each of said points in space, selecting an associated extension gate within said data processing system, said gate being an area centered about said point;

c) at each of a sequential series of points in time, receiving a plurality of hits from said plurality of targets, said hits being received by at least one of said plurality of sensor stations, and said hit comprising a received signal from one of said targets;

d) selecting a first of said targets to be updated and identifying said target's associated first track;

e) selecting a first point in time from said sequential series of points in time;

f) identifying a first point in space belonging to said first track, said first point associated with said first point in time;

g) identifying a second point in time, said second point in time immediately preceding in said sequential series said first point in time;

h) identifying a first extension gate, said first extension gate being associated with said first point;

i) identifying each of said plurality of hits which were received at said first point in time and which lies in said first extension gate;

j) selecting from said plurality of tracks, each of said tracks which enclose one of said identified hits;

k) for each of said identified hits, calculating a weight;

l) selecting a first hit from said identified hits and calculating a suboptimal probability for said first hit, said suboptimal probability obtained by dividing said weight associated with said first hit by the sum of a constant B and the sum of all of said calculated weights within said data processing system;

m) calculating a value v(k) of said first track, by taking the sum of said suboptimal probability of each of said identified hits multiplied by a difference between said hit and said first point within said data processing system; and n) updating and displaying said track associated with said first target by replacing said first point by the sum of said point associated with said second point in time and v(k).

2. A method as in claim 1 wherein said updating step (n) is comprised of the steps of replacing said first point by the sum of said point associated with said second point in time and the product of a tracking filter's gain and v(k).

3. A method as in claim 2 wherein said tracking filter is a Kalman filter.

4. A computer method for updating tracks as described in claim 1, wherein said calculation of a weight for each of said identified hits is comprised of the following steps:

a) selecting a first hit from said identified hits;

b) if there are no other tracks whose extension gate share hits with said first track's extension gate, said weight is set equal to the Gaussian density function of said first hit;

c) if there are other tracks whose extension gates shares hits with said first track's extension gate, said weight is calculated by the following steps:

calculating a value M where is the maximum value G where G is the value of the Gaussian density function for all other hits which lie in said tracks extension gate; and if said first hit is the only hit in said selected tracks extension gate, using the Gaussian value of the first hit for the value M;

d) repeating steps a through c for each of said identified hits; and e) calculating said weight for said identified hit by taking the Gaussian density function for said hit multiplied by the sum of each of said values M.

5. A computer method as in claim 1 wherein said updated track is the a track of an airplane.

* * * * *